United States Patent [19]

Gordon

[11] Patent Number: 4,869,451
[45] Date of Patent: Sep. 26, 1989

[54] WINDOW SHELF FOR PETS OR FLOWERS

[76] Inventor: Richard A. Gordon, 95 W. 3rd St., Freeport, N.Y. 11520

[21] Appl. No.: 50,099

[22] Filed: May 14, 1987

[51] Int. Cl.$^4$ .............................................. E04G 3/08
[52] U.S. Cl. .................................... 248/235; 248/236; 248/241
[58] Field of Search ............... 248/235, 236, 241, 237, 248/238, 298, 240; 211/90; 182/56, 62, 53; 108/152; 312/101

[56] References Cited

U.S. PATENT DOCUMENTS

| | | | |
|---|---|---|---|
| 262,508 | 8/1882 | Thomson | 248/237 X |
| 438,280 | 10/1890 | Wright | 108/152 |
| 510,194 | 12/1893 | Sellers | 248/236 |
| 687,371 | 11/1901 | Dreisbach | 108/152 |
| 798,683 | 9/1905 | Ketteman | 248/236 |
| 1,224,127 | 5/1917 | Bartlett | 108/152 X |
| 1,611,649 | 12/1926 | Laurita | 248/236 X |
| 1,748,207 | 2/1930 | Clough | 248/236 |
| 2,916,245 | 12/1959 | Williams | 248/242 |

Primary Examiner—Ramon S. Britts
Assistant Examiner—Karen J. Chotkowski
Attorney, Agent, or Firm—Bauer & Schaffer

[57] ABSTRACT

A shelf is provided for use in combination with a window having a window sill formed of a planar rectangular body having the rear edge adapted to rest on the window sill adjacent the window. Bracing means are provided for supporting the body at a level with the window sill, by creating at least one slot extending perpendicularly to its rear edge of the body into which and from which a bearing member is freely suspended. The bearing member has detents at the upper end which cause the member to slideably engage with the surface of the body so as to restrict the complete axial passage through the slot. A connecting rod is detachably secured at one end to the lower end of the bearing member and at its opposite end to the front end of the upper surface of the body. The connecting rod has a predetermined length wherein the bearing member is simultaneously extended by its full axial length from the body and is pressed against the front edge of the window sill and forms a fixed right triangle.

10 Claims, 3 Drawing Sheets

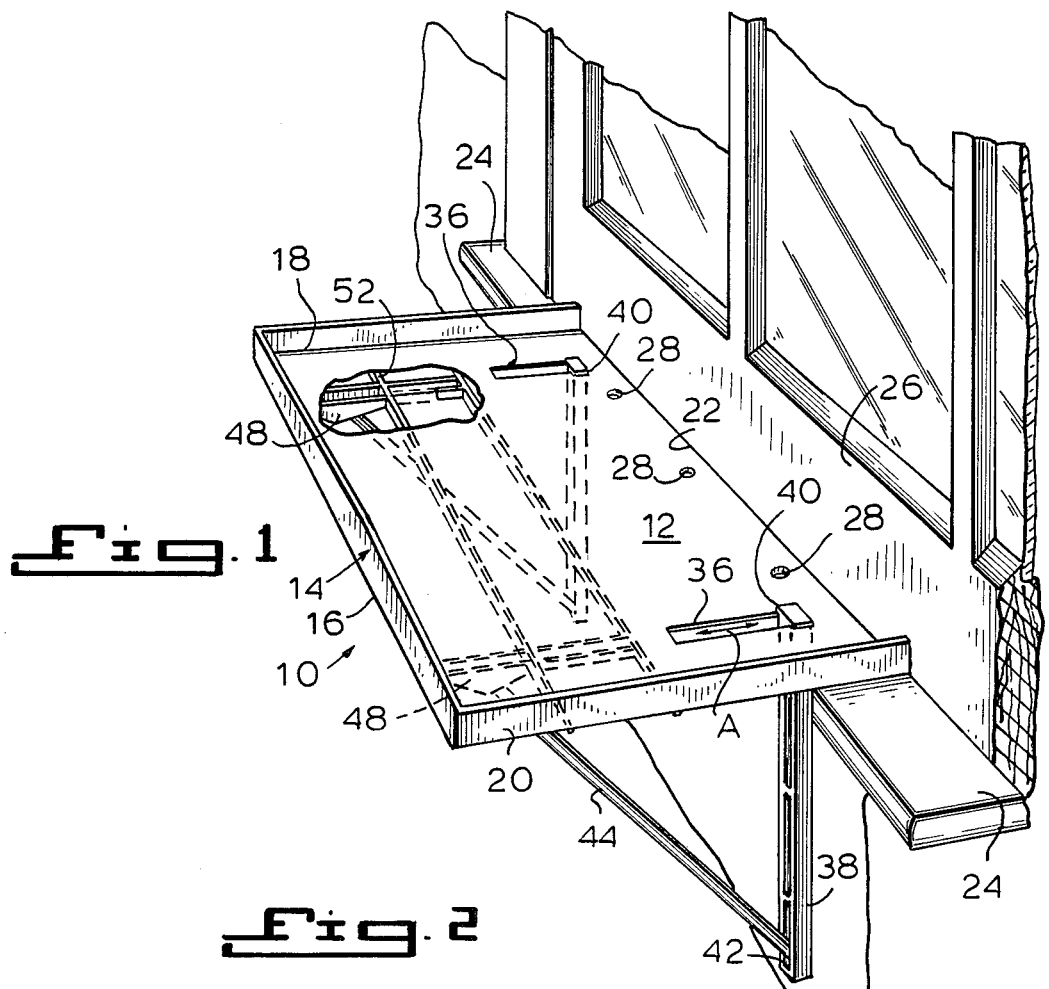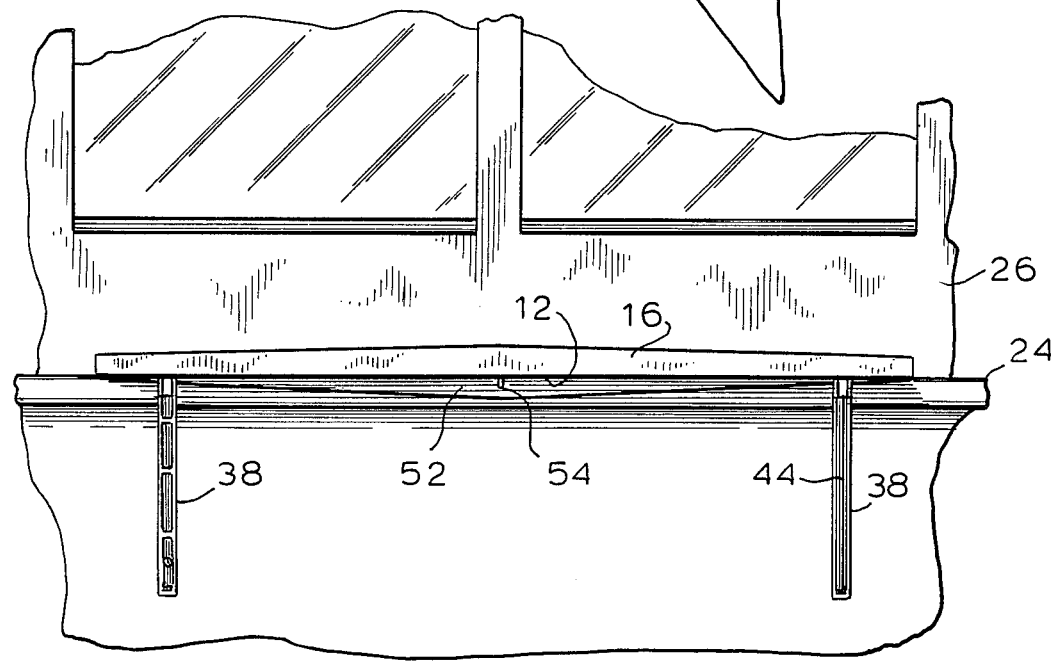

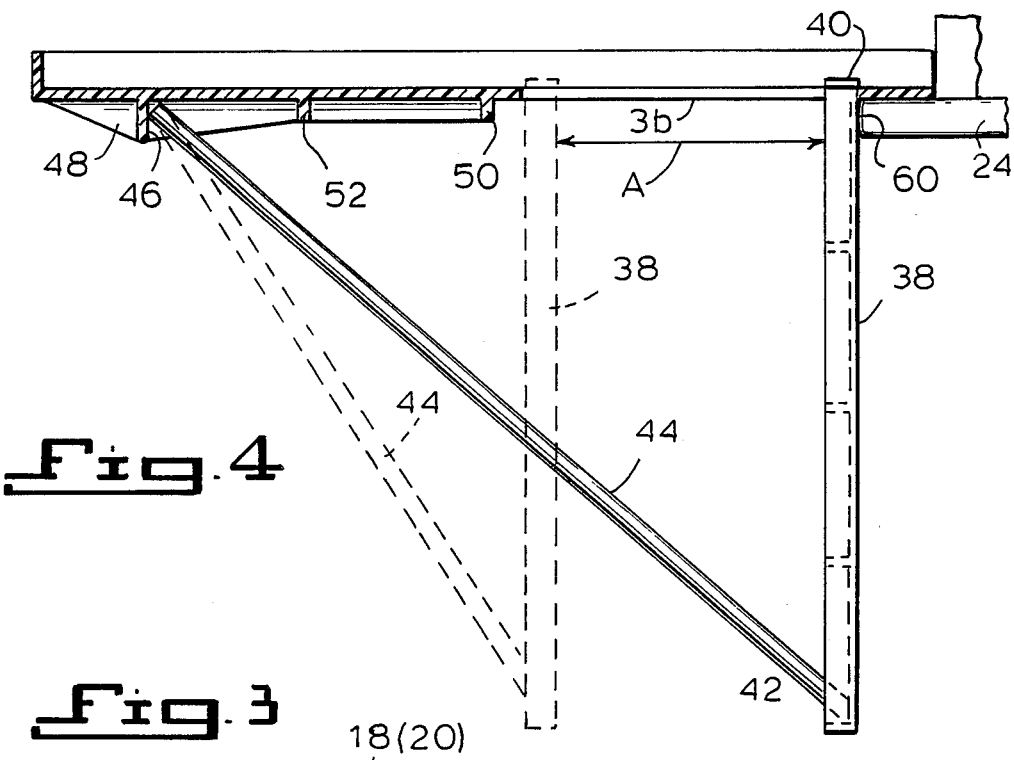
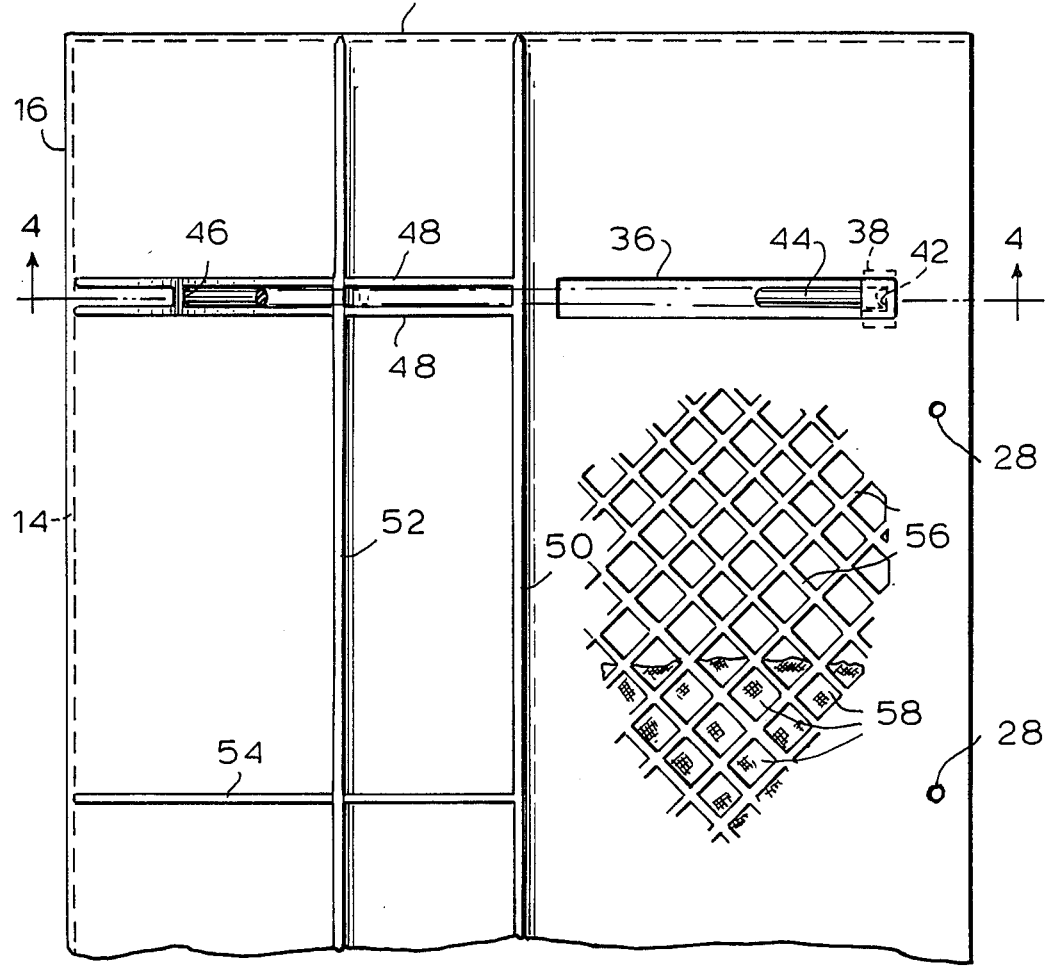

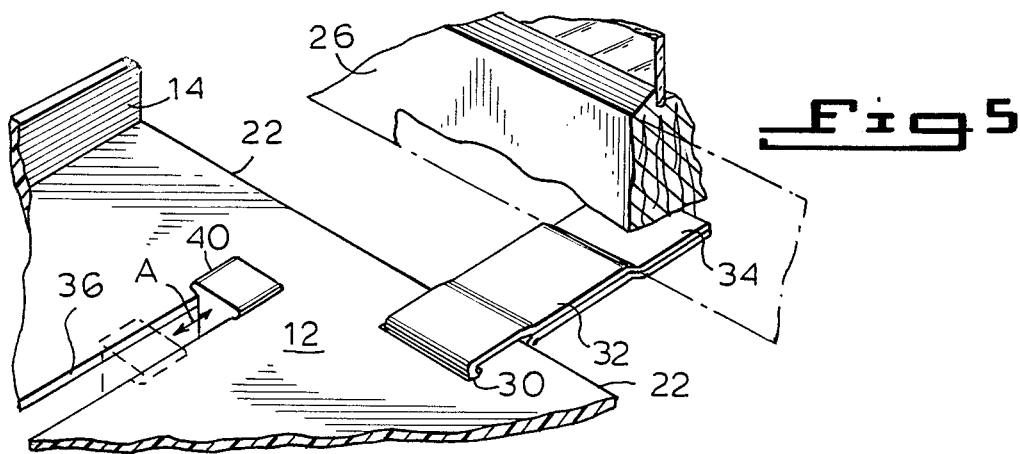
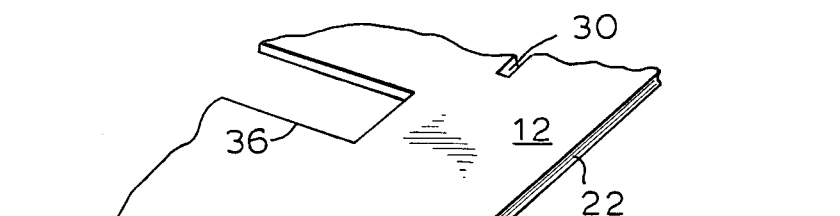
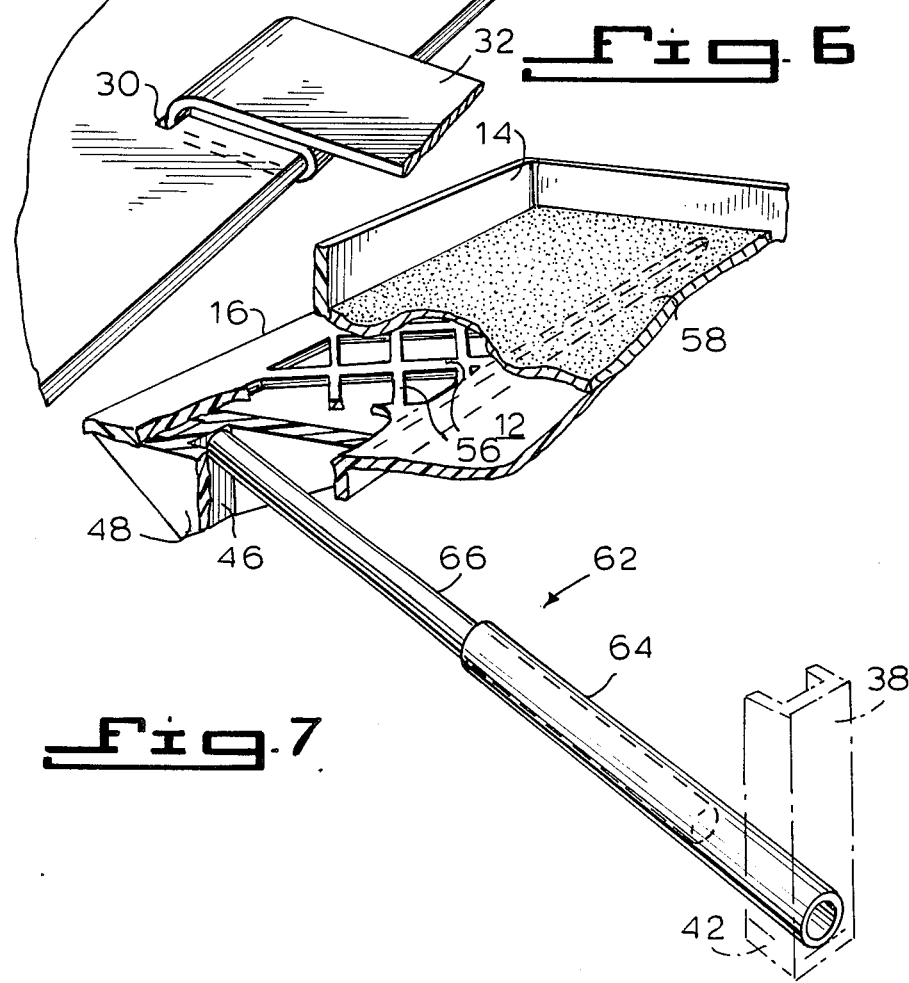

WINDOW SHELF FOR PETS OR FLOWERS

BACKGROUND OF THE INVENTION

The present invention relates to a shelf for use in combination with a window or similar opening on which pets may rest, or be used as a support for flowers or other household items or goods.

It is frequently advantageous to provide within the house, a window shelf upon which a pet may rest so as to look out the window or on which flowers may be placed. Shelves are known which can be attached by screws or the like, permanently to the interior window sill or by brackets extending outwardly beneath the window so as to be held by the closing of the window. In either case, a complex bracing or leg support arrangement is normally provided which requires an additional, more or less permanent attachment, either to the floor, the window, or the walls adjacent to the window so that the shelf does not sag, or tip, or bend over under the weight of the animal or flowers.

It is an object of the present invention to provide an improved shelf for cats and other pets or for the placement of flowers and similar items.

It is a further object of the present invention to provide an improved window shelf may be more easily assembled and placed into use than the shelves heretofore known.

It is an object of the present invention to provide a window shelf for pets or small household items which does not require permanent attachment to the floor for stability.

These objects, together with other objects and advantages will be apparent from the following disclosure.

SUMMARY OF THE INVENTION

According to the present invention, a shelf is provided for use in combination with a window having a window sill. The shelf comprises a planar rectangular body having the rear edge adapted to rest on window sill adjacent the window. Bracing means are provided for supporting the body at a level with the window sill. To this end, the body is provided with at least one slot extending perpendicularly to its rear edge into which and from which a bearing member is freely suspended. The bearing member has a cap at its upper end which causes the member to slideably engage with the surface of the body so as to restrict the complete axial passage of the bearing member through the slot. A connecting rod is detachably secured at one end to the lower end of the bearing member and at its opposite end to the front end of the under surface of the body. The connecting rod has a predetermined length wherein the bearing member is simultaneously extended by its full axial length from the body and is pressed against the front edge of the window sill and forms, a fixed right triangle.

A significant advantage of the above construction, lies in the fact that the bracing means are fully adjustable with respect to the depth of the window sill. The suspended bearing member which is allowed to move within the slot toward and from the rear edge of the body, serves to permit such adjustment, while constantly maintaining its perpendicular orientation with respect to the shelf body. In this manner, the shelf body always maintains a horizontal position and a forward end of the position is maintained against tipping.

Full details of the present invention are set forth in the following description and are illustrated in the accompanying drawings.

BRIEF DESCRIPTION OF THE DRAWINGS

In the drawings:

FIG. 1 is a perspective view showing the shelf of the present invention in use in combination with the window;

FIG. 2 is a front elevational view of the installation shown in FIG. 1;

FIG. 3 is a partial bottom plan of the shelf in the present invention;

FIG. 4 is a side elevational view showing the bracing means employed in the present invention;

FIG. 5 is an enlarged partially sectioned view showing a further embodiment for securing the shelf to the window;

FIG. 6 is another form of means for attaching the shelf to the window;

FIG. 7 is an enlarged partially sectioned view showing the means by which the connecting rod of the brace means is measured to a predetermined size.

DESCRIPTION OF THE INVENTION

Referring to the drawings, the shelf of the present invention, generally depicted by the numeral 10, comprises a body 12 made of flat rectangular rigid sheet of plastic, having a perpendicular peripheral wall 14 along the front edge 16 and each of the short edges 18 and 20. The rear edge 22 of the body 12 lacks a wall, since it is intended to rest upon the window sill 24 in abuttment with a window frame 26, although if desired, it may have such a wall. Along the rear edge 22, the shelf 10 is provided with a plurality of spaced holes 28 by which the shelf may be attached directly in fixed position to the window sill 24.

In lieu of the screw holes 28, the body 12 may be provided as shown in FIGS. 5 and 6 with one or more slits 30 extending parallel to the rear edge 22, through which a plastic or metal strap 30 may be wound so that the end 34 of the strap 32 will extend outwardly from the rear of the body beneath the window 26, as a consequence of which, when the window 26 is closed, the strap 32 will be held firmly in place. It may be preferred however, that the shelf 10 be screwed to the window sill 24 so that the window 26 can be left free to be raised whenever the weather permits. A screen or other barrier, allowing free flow of air, but barring movement of the cat or dog, may be inserted within the window.

Referring to FIGS. 1–4, the rectangular shelf body 12 is maintained in horizontal position, even when it may be loaded with pets or other impedimenta, by providing it with a pair of elongated slots 36 adjacent each of its side edges 18 and 20 and which extend perpendicular to the rear edge 22. Each slot 36 is adapted to receive an elongated channel shaped bearing member 38 having a head 40 at its upper end which allows the bearing member 38 to hang freely, more or less perpendicularly, to the plane of the body 12. The bearing member 38 is thus slideably moveably along the axis of the slot 36 as indicated by the arrow A (FIG. 4) while hanging vertically therefrom. A seat 42 is formed at the lower end of the bearing member 38, into which one end of a rod 44 or other dowel shaped member is detachably inserted. The rod 44 extends upwardly at an angle from the seat 42 toward the front of the shelf body 12 to detachably fit within a second seat 46 formed in the lower surface of the shelf 12.

As seen clearly in FIGS. 3 and 4, the second seat 46 formed in the shelf 12 is created by the relationship of a pair of parallel truss-like members 48 integrally formed along the bottom surface of the shelf. The truss members 48 extend rearwardly from the front edge 16, in alignment with a respective one of the slots 36 and terminate, intermediate the shelf, integrally with a traverse strengthening rib 50 extending between the sides 18 and 20. At least one additional transverse rib 52 is provided in the forward portion of the shelf, as well as one or more trusses 54, intermediate the ends. In addition to forming the seat 46 for the connecting rod 44, the truss ribs 48 provide additional strength and prevent the sheet-like shelf 12 from twisting or bending. The number of trusses 48, as well as ribs, etc., may be selected as desired.

While the bearing member 38 is shown as a channel section, it will be clear that other forms can be used as well, as for example, a solid rod with a hole at its lower end could be used, or a solid rod with a removable socket may also be used. Similarly the seat 46, integrally formed with truss members 48, may also be formed in any other manner.

The flat shelf body 12, is preferably formed of laticework generally shown by numeral 56 having in total, a large open area. Such latice-working of the surface reduces the weight of the shelf 10, and the cost of its manufacture without unduly sacrificing its strength. The latice structure has an additional advantage in that it provides for free flow of air, not only over th shelf's surface, but through the shelf itself. This is a particular advantage when the shelf is being used for pets or the like. In addition, the surface permits itself to be covered with a carpet 58 or other soft material, more agreeable to a pet than a solid plastic, wood or metal surface and can be readily cleaned or replaced.

It will be seen from at least FIGS. 1 and 4, that when the shelf 10 is placed in position in combination with the window, the hanging bearing member 38 and the connecting rod 44, cooperate with the plane of the shelf body 12 to provide a secure and stable arrangement. The hanging bearing member 38, first being slideable (Arrow A) within the slot 36, clearly allows the shelf 10 to be placed upon the window sill 24 so that its rear edge abuts against the window frame 26. The connecting rod 44 is chosen of such a predetermined length, that when it is inserted, it simultaneously presses the hanging bearing member 38 against the edge 60 of the window sill 24 while causing its full extension below the surface of the shelf 10. The cap 40 or detent at the upper end of the hanging bearing member 38, engages with the surface of the shelf body 12 about the edges of the slot 36, so as to prevent the bearing member 38 from canting, skewing, or twisting relative to the slot 36 and thus insures that the bearing member 38 hangs truly perpendicular to the plane of the shelf body 12. Consequently, the hanging bearing member 38, the connecting rod 44, and the shelf body 12, define a right triangle with a perpendicular angle made between the hanging bearing member 38 and the shelf body 12 itself no matter where along the length of the slot 36, the bearing member 34 is placed. The connecting rod 44 thus becomes the hypotenuse that is in inherent in right triangles, preventing distortion of the right triangle, so that the shelf 10 can neither sag, tip or turn over.

The dotted lines in FIG. 4 show the ability of the device to be adjustable for different size window sills 24, the only modification being required is in the length of the connecting rod 44. Notwithstanding any adjustment in the position of the suspended bearing member 38, it will remain perpendicular to the shelf body 12 and at a right angle to the plane of the shelf even though the hypotenuse (i.e. rod 44) must be shortened, to its predetermined length. The predetermined length of the connecting rod 44 may be determined mathematically in accordance with principles of right triangles. However, to simplify the method of determining this length, insitu, simple apparatus is provided for use with the present invention. As seen in FIG. 7, a telescoping measuring dowel, generally depicted by the numeral 62 is shown. The measuring dowel 62 comprises an outer sleeve 64 and an inner rod 66 which slides with considerable force fit within the sleeve 64. Each of the sleeve and rod members 64 and 66 respectively, are shorter in length than the anticipated distance between the seat 42 of the lower end of the hanging bearing member 38 and the seat 46 in the body 12, but in combination, are significantly longer. Thus, the measuring dowel 62 may be placed between the two seats 42 and 46 respectively and the rod member 66 extended until the precise length for the connecting rod 44 is determined. A mark may then be placed on the rod 66 and the measuring dowel 62 removed. The rod 66 may then be freely extended to its measured length, compared with a piece of bar or rod stock from which the connecting rod 44 may be made and the connecting rod 44 then cut to the exact measurement.

Various changes and modifications have been suggested herein and others will be obvious to those skilled in the art. It is intended therefore that the present disclosure be taken as illustrative only and not as limiting of the invention.

What is claimed is:

1. A shelf for use in combination with a window having a window sill, comprising a one piece planar rectangular platform body having an upper and lower surface, a front edge and a rear edge adapted to rest on said window sill adjacent the front edge of said window when said window is closed and bracing means for supporting said platform body at a level with said window sill, said body having at least one elongated slot extending through said body in a direction perpendicular to the rear edge of said body, said bracing means comprising a bearing member freely suspended from said body through a corresponding one of said at least one slot and having detent means at an upper end for slideably engaging the upper surface of said body to restrict the axial passage of said bearing member through said slot and a separate connecting rod detachably secured between the lower end of said bearing member and the front edge of said body, said connecting rod having a predetermined length whereby the bearing member simultaneously depends by its full axial length from said body, is pressed against the front edge of said window sill and is maintained perpendicular to the plane of said body.

2. The shelf according to claim 1, including holes spaced along the rear edge of said body to allow fastening of said body to said window sill.

3. The shelf according to claim 1, including flexible tab means extending from the rear of said body and placeable beneath the window to secure said body to said window and sill.

4. The shelf according to claim 3, wherein said tabs are detachably threaded through slots formed in said body.

5. The shelf according to claim 1, wherein the surface of said body is formed with a plurality of openings therein providing a latice-work construction.

6. The shelf according to claim 5, including a fabric cover for said latice work construction.

7. The shelf according to claim 1, wherein said bearing member comprises a channel section having a head at one end defining the detent means, and a socket at its lower end for receiving said connecting rod.

8. The shelf according to claim 7, wherein said body is provided with a plurality of truss ribs along its lower surface for strengthening said body, at least one pair of said truss ribs being arranged in alignment with the slot through which said bearing member hangs and are arranged spaced from each other to form a socket at the front end of said body to receive an end of said connecting rod, said truss ribs.

9. The shelf according to claim 1, wherein said slot extends from a point spaced from the rear edge forwardly toward said truss ribs allowing said bearing member to be adjustably positioned from the rear edge.

10. The shelf according to claim 1, including means for determining the length of said connecting rod comprising a sleeve and a dowel slideably held in said sleeve, each of said sleeve and dowel being individually shorter than said connecting rod and being jointly longer than said connecting rod, allowing said sleeve and dowel to be adjusted in situ between said bearing member and front end to the predetermined length.

* * * * *